(12) United States Patent
Sivakumar et al.

(10) Patent No.: US 12,387,052 B2
(45) Date of Patent: Aug. 12, 2025

(54) VERSION BASED MODEL RESULT EXPLAINABILITY

(71) Applicant: International Business Machines Corporation, Armonk, NY (US)

(72) Inventors: Gandhi Sivakumar, Bentleigh (AU); Kushal S. Patel, Pune (IN); Jianbin Tang, Doncaster East (AU); Sarvesh S. Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 775 days.

(21) Appl. No.: 17/513,372

(22) Filed: Oct. 28, 2021

(65) Prior Publication Data
US 2023/0138343 A1    May 4, 2023

(51) Int. Cl.
| | | |
|---|---|---|
| *G06F 40/40* | (2020.01) | |
| *G06F 40/194* | (2020.01) | |
| *G06F 40/30* | (2020.01) | |
| *G06F 40/56* | (2020.01) | |
| *G06N 5/045* | (2023.01) | |

(52) U.S. Cl.
CPC ............ *G06F 40/40* (2020.01); *G06F 40/194* (2020.01); *G06F 40/30* (2020.01); *G06F 40/56* (2020.01); *G06N 5/045* (2013.01)

(58) Field of Classification Search
CPC .......... G06F 40/30; G06F 40/40; G06F 40/56; G06F 40/194; G06N 5/045
See application file for complete search history.

(56) References Cited

U.S. PATENT DOCUMENTS

| | | | |
|---|---|---|---|
| 9,069,767 B1* | 6/2015 | Hamaker | G06F 40/194 |
| 9,495,127 B2 | 11/2016 | Ballinger et al. | |
| 9,836,455 B2 | 12/2017 | Martens et al. | |
| 10,929,756 B1 | 2/2021 | Sadaghiani | |
| 2004/0230952 A1* | 11/2004 | Massaro | G06F 40/197 |
| | | | 717/110 |
| 2019/0370697 A1 | 12/2019 | Ramachandra Iyer | |
| 2020/0279140 A1* | 9/2020 | Pai | G06F 11/3447 |

(Continued)

FOREIGN PATENT DOCUMENTS

CN    103959283 B    12/2016

OTHER PUBLICATIONS

Czakon, Explainable and Reproducible Machine Learning Model Development with DALEX and Neptune, Jul. 19, 2021, https://neptune.ai/blog/explainable-and-reproducible-machine-learning-with-dalex-and-neptune.

(Continued)

*Primary Examiner* — Samuel G Neway
(74) *Attorney, Agent, or Firm* — Garg Law Firm, PLLC; Rakesh Garg; Matt Zehrer

(57) ABSTRACT

A first version of a model specified by a model execution request is executed, producing a first execution result. A second version of the model is selected according to an input data attribute specified by the model execution request. The second version of the model is executed, producing a first execution result. Using a natural language processing engine, responsive to the first execution result and the second execution result differing by more than a threshold amount, a natural language explanation of a difference between the first execution result and the second execution result is constructed.

16 Claims, 9 Drawing Sheets

(56) References Cited

U.S. PATENT DOCUMENTS

| | | | | |
|---|---|---|---|---|
| 2021/0158227 A1* | 5/2021 | Budzik | ............... | G06N 5/01 |
| 2021/0398000 A1* | 12/2021 | Denker | ............... | G06N 5/045 |
| 2022/0207241 A1* | 6/2022 | Bettencourt-Silva | ... | G06F 40/30 |
| 2023/0076559 A1* | 3/2023 | Sankarapu | ............... | G06Q 40/03 |
| 2023/0138343 A1* | 5/2023 | Sivakumar | ............... | G06N 3/08 |
| | | | | 704/9 |
| 2023/0147985 A1* | 5/2023 | Totsuka | ............... | G06N 5/045 |
| | | | | 706/12 |

OTHER PUBLICATIONS

Weinzierl et al., XNAP: Making LSTM-based Next Activity Predictions Explainable by Using LRP, Dec. 23, 2020.

Sarkar, Google's new 'Explainable AI (xAI) service, Nov. 25, 2019, https://towardsdatascience.com/googles-new-explainable-ai-xai-service-83a7bc823773.

Google, Using enhanced models, Cloud Speech-to-Text Documentation, 2021, https://cloud.google.com/speech-to-text/docs/enhanced-models.

Zeng et al., Speech recognition with amplitude and frequency modulations, Feb. 15, 2005, vol. 102, No. 7, pp. 2293-2298.

* cited by examiner

VERSION BASED MODEL RESULT EXPLAINABILITY

BACKGROUND

The present invention relates generally to a method, system, and computer program product for model result explainability. More particularly, the present invention relates to a method, system, and computer program product for version based model result explainability.

A model maps input data to an output prediction. For example, a model might be used to predict a loan default rate from input data of a potential borrower, and to suggest loan approval if the predicted loan default rate for the potential borrower is below a threshold. As another example, an image classification model predicts, or outputs, a classification of an input image.

Explainability refers to provision of an explanation of a model's output prediction along with, or included with, a model's output prediction. For example, for a loan default rate prediction model, given input data of the potential borrower's income, currently monthly expenses, and the proposed loan to value ratio of the asset being borrowed upon, an explanation of the model's prediction might be that 75% of borrowers in the past five years with incomes, monthly expenses, and loan to value ratios within a predetermined range of the potential borrower's income, monthly expenses, and loan to value ratio have not defaulted on their loans, so this potential borrower has a 70% chance of not defaulting as well. As another example, for an image classification model, an explanation of the model's prediction might be that because an input image scored above a 90% similarity to a set of training images labelled as being images of cats, this particular input image is predicted to be of a cat as well, with an 85% confidence value.

A model is often trained in stages, with each stage updating existing predictions based on additional training data. For example, a loan default rate prediction model might be updated once a year to incorporate additional data accumulated during the year, or an image classification model might be updated periodically with training data incorporating different image subjects. As well, different stages of model training might incorporate different or additional attributes. An attribute is a label for data. For example, income, monthly expenses, and loan to value ratio are all attributes labelling particular pieces of data. For example, additional analysis might have shown that predictions from the loan default prediction model are improved by adding an additional attribute: whether the property be considered for a loan is to be used for residential or commercial use, so the model is further trained with training data including the property's intended use. In addition, a model's architecture might change over time, for example to incorporate additional processing capabilities, add additional layers or connections, or to improve the model's computation speed or accuracy. In some cases, a model is also untrained, or has its training altered, using additional training data. For example, an image classification model might be untrained or retrained by altering the classification of some images within the training data, or adding new training data with new classifications, and retraining the model with the new data. Retraining might be used, for example, to adapt a model to a different use, such as retraining an image classification model from classifying images of animals to classifying images of machine parts.

SUMMARY

The illustrative embodiments provide a method, system, and computer program product. An embodiment includes a method that executes, producing a first execution result, a first version of a model, the model specified by a model execution request. An embodiment selects, according to an input data attribute specified by the model execution request, a second version of the model. An embodiment executes, producing a second execution result, the second version of the model. An embodiment constructs, using a natural language processing engine, responsive to the first execution result and the second execution result differing by more than a threshold amount, a natural language explanation of a difference between the first execution result and the second execution result.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
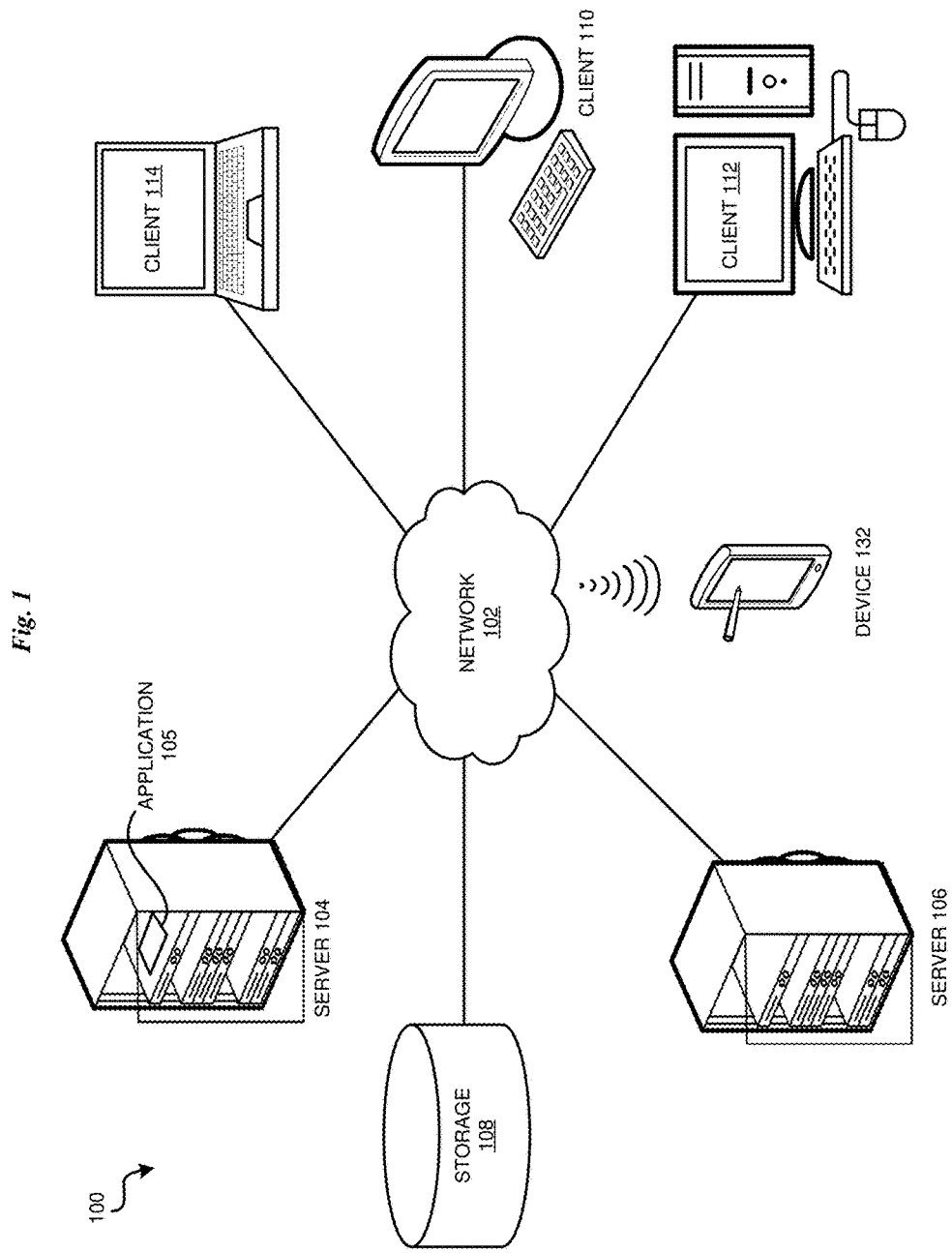
FIG. 1 depicts a block diagram of a network of data processing systems in which illustrative embodiments may be implemented.

The illustrative embodiments recognize that an explanation of a model's output prediction helps build user trust that the model is functioning as expected and that model outputs are based expected data attributes. In addition, an explanation of a model's incorrect prediction is useful in improving the model, for example by providing additional training data in a particular subject area. For example, if an image classification model confuses horses with cows, the model might be further trained with additional images of horses and cows until the model learns to more reliably distinguish between the two species. As well, some jurisdictions require model output explanations if a model output is used to make certain types of decisions.

The illustrative embodiments also recognize that currently, model output explanations, if available at all, explain results only of a model's current version. Thus, model users do not have insight into how different stages of model development affect the model's results, or have insight into whether a particular stage of model development or training data set might have affected the model's results in an undesired manner. Thus, the illustrative embodiments recognize that there is an unmet need to explain a model's output including how a model's version has affected the model's output.

The illustrative embodiments recognize that the presently available tools or solutions do not address these needs or provide adequate solutions for these needs. The illustrative embodiments used to describe the invention generally address and solve the above-described problems and other problems related to version based model result explainability.

An embodiment can be implemented as a software application. The application implementing an embodiment can be configured as a modification of an existing data modeling system, as a separate application that operates in conjunction with an existing data modeling system, a standalone application, or some combination thereof.

Particularly, some illustrative embodiments provide a method that executes a first version of a model specified by a model execution request, selects a second version of the model according to an input data attribute specified by the model execution request, executes the second version of the model, and constructs a natural language explanation of a difference between the first execution result and the second execution result.

An embodiment manages version data of a model. Some non-limiting examples of a model's version data are a date on which a version was made available for use, a version's number (including one or more alphanumeric characters, e.g. version 1.2 or 3.14.B), the training data used to generate the version (e.g. that the model has been improved over a previous version, which only supported classifying images as cats or not, to now support classifying images as dogs as well as cats), the attributes of input data the version uses (e.g. income, monthly expenses, and loan to value ratio), architecture data of the version (e.g. how many hidden layers the version includes, or how layers are connected to each other), and the like. One embodiment stores one or more model versions that are available for use, as well as data about each version, in a model library. One embodiment monitors model training and updates data about model versions concurrently with training. Another embodiment monitors model version releases and updates data about model versions concurrently with each model release, from data included in the model release. Another embodiment receives model and version data asynchronously from training or releases, or from another source.

An embodiment receives a model execution request. The execution request specifies a set of input data and the model to be used to make a prediction using the input data. In one embodiment, the execution request specifies one or more attributes corresponding to the input data. For example, one execution request might specify that the loan default rate prediction model is to be used to process input data, included in the request, labelled as potential borrower's income, monthly expenses, and loan to value ratio. In another embodiment, the execution request need not specify one or more attributes corresponding to the input data, because the attribute is already known. For example, one execution request might specify that the image classification model is to be used on an input image included in the request. Another embodiment uses a default value for any data not specified in the execution request. For example, if an embodiment's model library only includes versions of one model, e.g. the image classification model, a request need not specify the model to be used.

An embodiment executes one version of a model according to the model execution request. In one embodiment, the version executed is always the most recent version of the requested model. In another embodiment, a user selects the version.

An embodiment selects a second version of a model according to the model execution request. One embodiment receives and implements a user's selection of the second version. Another embodiment selects the next-most recent version of the model as the second version. Another embodiment, in an environment which classifies model updates as major and minor, where a major update denotes more change than a minor update, selects the next-most current major update of the model as the second version. Another embodiment selects a version for which one or more of a model's input data attributes have changed by more than a threshold amount from one or more attributes in the model execution request. For example, a request for execution of the loan default prediction model might include the income, monthly expenses, loan to value ratio, and intended use attributes, but an older version of the model might not have supported the intended use attribute. Another embodiment selects a version for which the model's training data has changed by more than a threshold amount or another measure of change from the first selected model version. For example, the image classification model might currently support classifying images both of cats and dogs, while a previous version might have only supported classifying images of cats.

An embodiment executes the selected second version of the model according to the model execution request. One embodiment executes both model versions serially, to conserve model execution resources. Another embodiment executes both model versions concurrently, to minimize the overall time needed to produce a final result.

An embodiment compares outputs of the two model versions. If the two execution results differ by less than a threshold amount, one embodiment selects a different model version as the second version in a manner described herein, and repeats the execution and comparison process until the execution results differ by more than a threshold amount, there are no additional model versions to select, a predefined number of iterations has been executed, or another stopping point is reached. Thus, particular embodiments select a version two releases before a current version, two major updates before a current version, a version for which the model's input data attributes have changed by more than a second, higher than the first, threshold amount from the attributes in the model execution request, or a version for which the model's training data has changed by more than a second, higher than the first, threshold amount. Another embodiment does not repeat the execution and comparison process if the two execution results differ by less than a threshold amount.

An embodiment uses the two model execution results, any intermediate results that were computed, and version data of the versions that were executed to construct a natural language explanation of the execution results. For example, for image classification results that matched each other, one natural language explanation of the execution results might be, "I am 80% confident that this is an image of a cat. I also checked a previous version of this model, which helped me confirm this result." As another example, for image classification results that differ from each other by more than a threshold amount, one natural language explanation of the execution results might be, "Based on the most current model, this is an image of a zebra. Using a previous version of this model that was trained on horses but not zebras, I would have classified this image as a horse." Thus, the natural language explanation helps a user understand how the model is being developed to include additional types of animals. The natural language explanation also helps a user identify a need for additional model training or other model improvement. For example, if a model classifies both an image of a real horse and an image of a stuffed horse toy as a horse, and previous versions of the model agree with these classifications, a user might realize that the model needs additional training to distinguish real horses from stuffed toys. To construct a natural language explanation of the execution results, an embodiment uses a natural language processing engine, using one or more presently known techniques.

The manner of version based model result explainability described herein is unavailable in the presently available methods in the technological field of endeavor pertaining to data modeling. A method of an embodiment described herein, when implemented to execute on a device or data processing system, comprises substantial advancement of the functionality of that device or data processing system in executing a first version of a model specified by a model execution request, selecting a second version of the model according to an input data attribute specified by the model execution request, executing the second version of the model, and constructing a natural language explanation of a difference between the first execution result and the second execution result.

The illustrative embodiments are described with respect to certain types of models, versions, attributes, model input and output data, thresholds, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
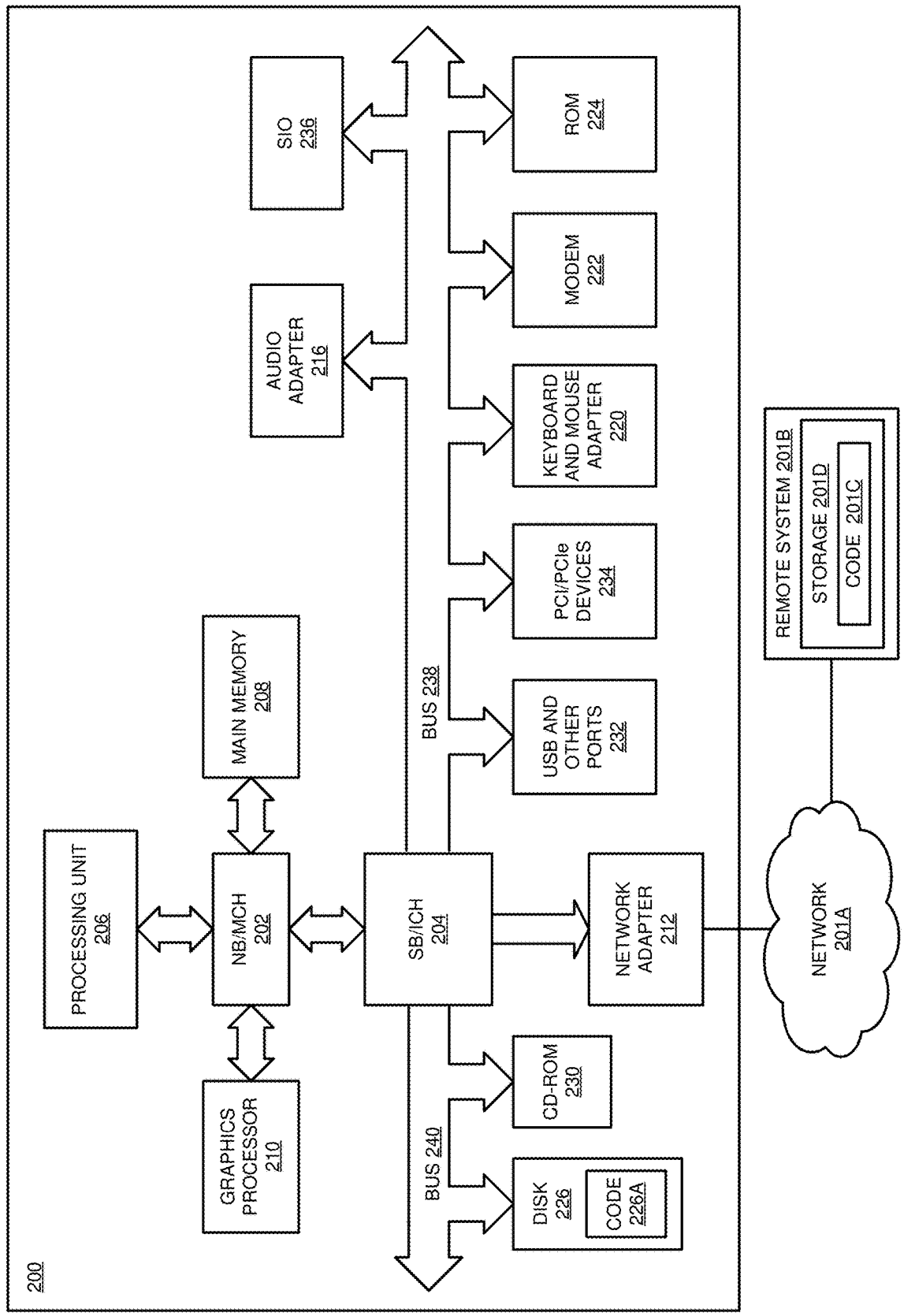
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
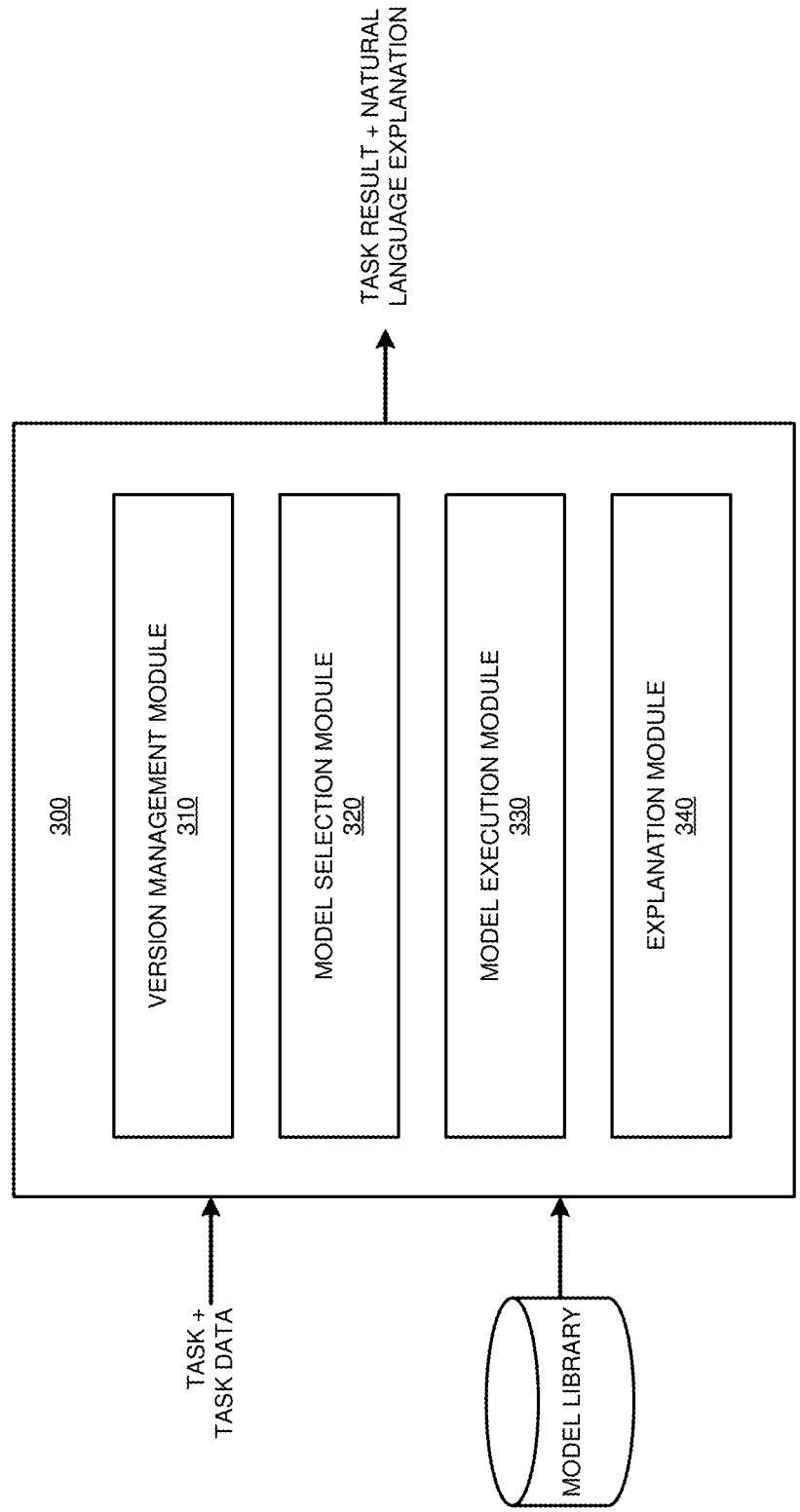
FIG. 3 depicts a block diagram of an example configuration for version based model result explainability in accordance with an illustrative embodiment.

With reference to FIG. 3, this figure depicts a block diagram of an example configuration for version based model result explainability in accordance with an illustrative embodiment. Application 300 is an example of application 105 in FIG. 1 and executes in any of servers 104 and 106, clients 110, 112, and 114, and device 132 in FIG. 1.

Version management module 310 version data of a model, for example a date on which a version was made available for use, a version's number, the training data used to generate the version, the attributes of input data the version uses, architecture data of the version, and the like. One implementation of module 310 stores one or more model versions that are available for use, as well as data about each version, in a model library. One implementation of module 310 monitors model training and updates data about model versions concurrently with training. Another implementation of module 310 monitors model version releases and updates data about model versions concurrently with each model release, from data included in the model release. Another implementation of module 310 receives model and version data asynchronously from training or releases, or from another source.

Application 300 receives a model execution request, in the form of a task and associated task data. The execution request specifies a set of input data and the model to be used to make a prediction using the input data. In one implementation of application 300, the execution request specifies one or more attributes corresponding to the input data. In another implementation of application 300, the execution request need not specify one or more attributes corresponding to the input data, because the attribute is already known. Another implementation of application 300 uses a default value for any data not specified in the execution request.

Model execution module 330 executes one version of a model according to the model execution request. In one implementation of application 300, the version executed is always the most recent version of the requested model. In another implementation of application 300, a user selects the version.

Model selection module 320 selects a second version of a model according to the model execution request. One implementation of module 320 receives and implements a user's second version selection. Another implementation of module 320 selects the next-most current version of the model as the second version. Another implementation of module 320, in an environment which classifies model updates as major and minor, where a major update denotes more change than a minor update, selects the next-most current major update of the model as the second version. Another implementation of module 320 selects a version for which the model's input data attributes have changed by more than a threshold amount from the attributes in the model execution request. Another implementation of module 320 selects a version for which the model's training data has changed by more than a threshold amount or another measure of change from the first selected model version.

Model execution module 330 executes the selected second version of the model according to the model execution request. One implementation of module 330 executes both model versions serially. Another implementation of module 330 executes both model versions concurrently.

Application 300 compares outputs of the two model versions. If the two execution results differ by less than a threshold amount, module 320 selects a different model version as the second version in a manner described herein, module 330 repeats the execution process, and application 300 compares results until the execution results differ by more than a threshold amount, there are no additional model versions to select, a predefined number of iterations has been executed, or another stopping point is reached. Thus, particular implementations select a version two releases before a current version, two major updates before a current version, a version for which the model's input data attributes have changed by more than a second, higher than the first, threshold amount from the attributes in the model execution request, or a version for which the model's training data has changed by more than a second, higher than the first, threshold amount. Another implementation of application 300 does not repeats the execution and comparison process if the two execution results differ by less than a threshold amount.

Explanation module 340 uses the two model execution results, any intermediate results that were computed, and version data of the versions that were executed to construct a natural language explanation of the execution results. To construct a natural language explanation of the execution results, module 340 uses a natural language processing engine, using one or more presently known techniques.

Figure 4:
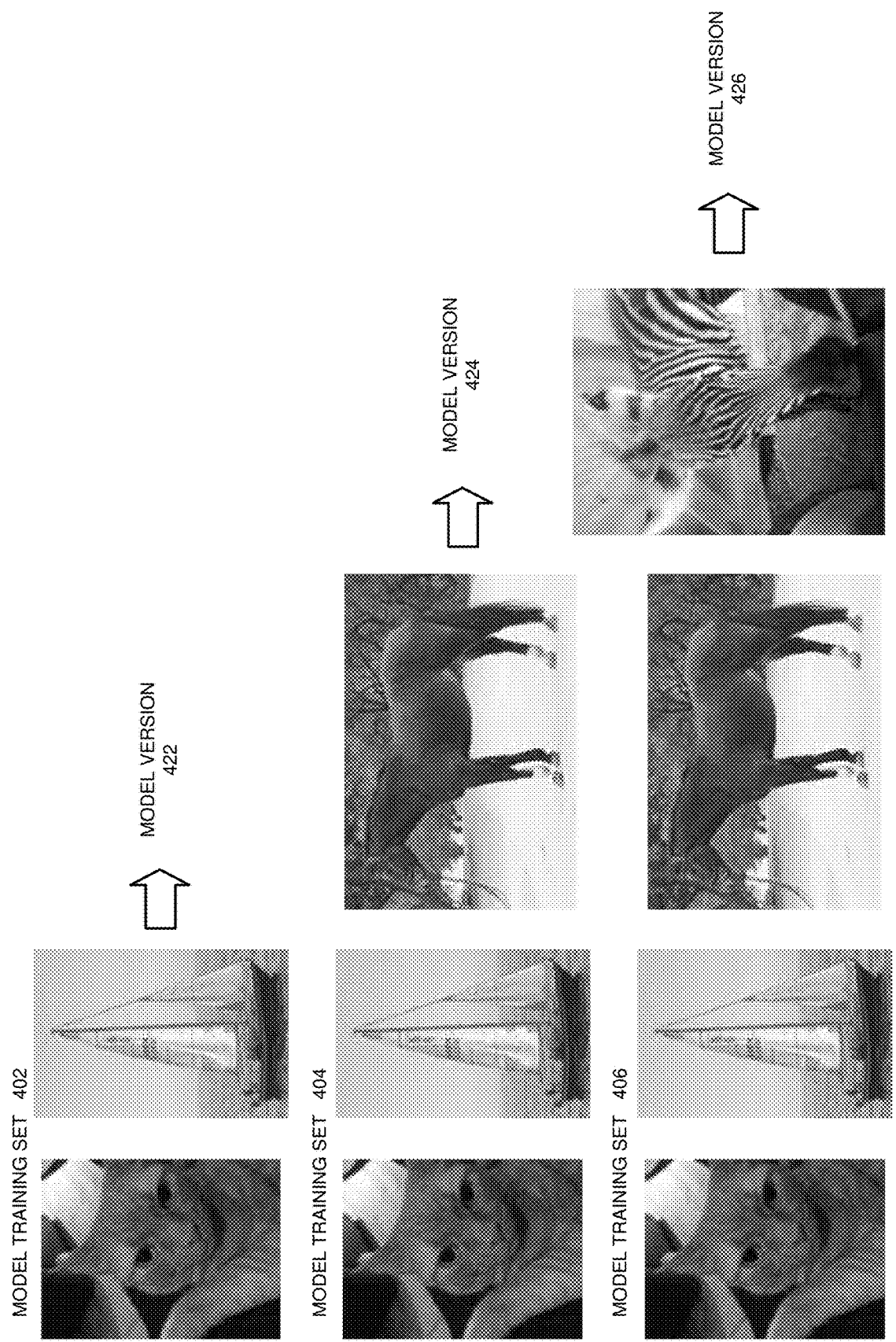
FIG. 4 depicts an example of version based model result explainability in accordance with an illustrative embodiment.

With reference to FIG. 4, this figure depicts an example of version based model result explainability in accordance with an illustrative embodiment. The example can be executed using application 300 in FIG. 3.

Model training set 402 depicts examples of images used to train image classification model version 422. In particular, model version 422 is being trained to classify images as either cats or non-cats.

Model training set 404 depicts examples of images used to train image classification model version 424, a later version of version 422. In particular, model version 424 is being trained to classify images as cats, horses, or something that is neither a cat nor a horse.

Model training set 406 depicts examples of images used to train image classification model version 426, a later version of version 424. In particular, model version 426 is being trained to classify images as cats, various equines (including horses, zebras, donkeys, and other equine species) or something else.

Figure 5:
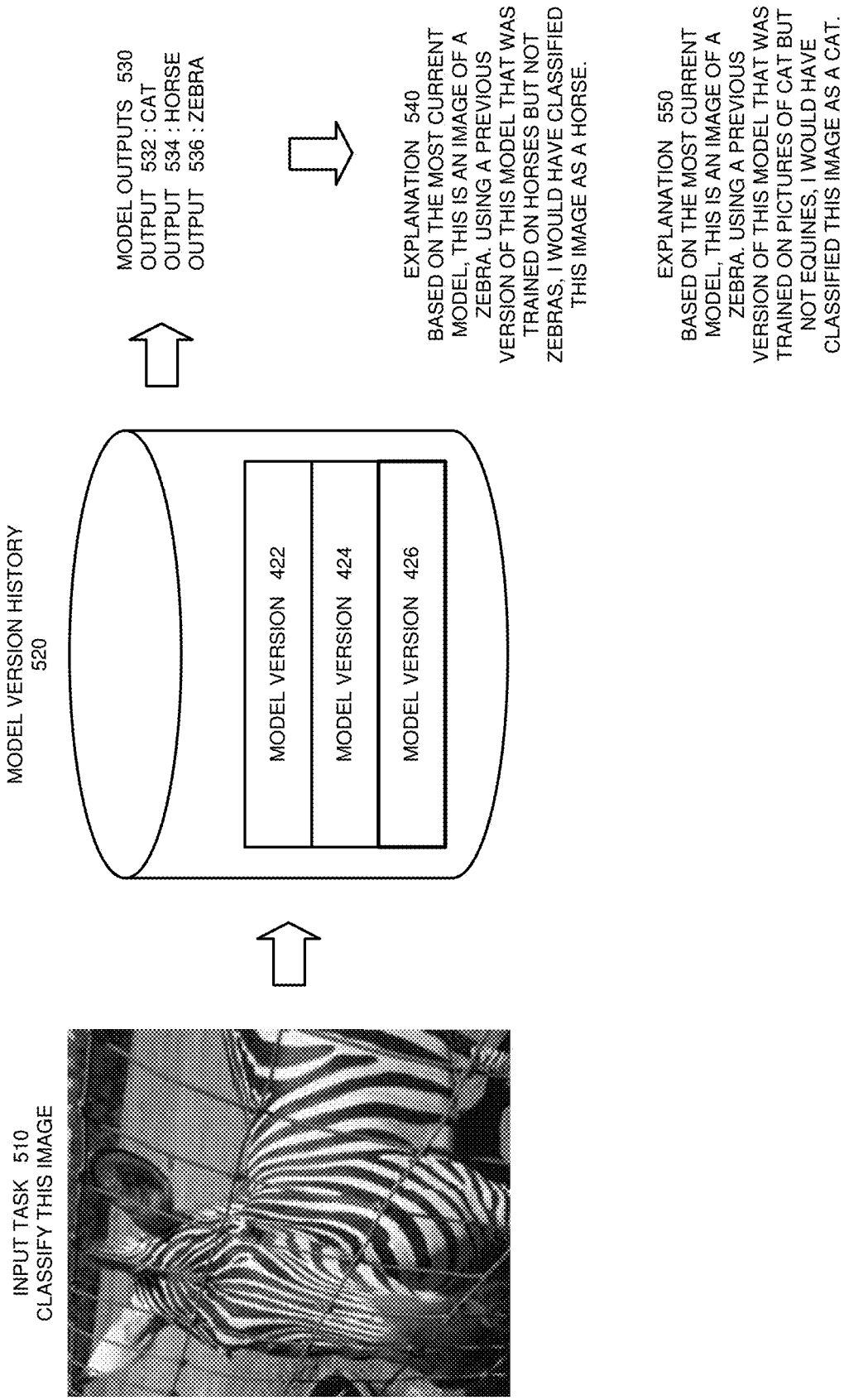
FIG. 5 depicts a continued example of version based model result explainability in accordance with an illustrative embodiment.

With reference to FIG. 5, this figure depicts a continued example of version based model result explainability in accordance with an illustrative embodiment. Model versions 422, 424, and 426 are the same as model versions 422, 424, and 426 in FIG. 4.

Input task 510 is a model execution task to classify an image. To perform task 510, application 300 uses model versions 422, 424, and 426, stored in model version history 520 to produce model outputs 530. In particular, because model version 422 is trained to classify images as either cats or non-cats and the image in input task 510 includes features that are more like a cat than a non-cat, version 422 produces output 532: the image is classified as a cat. Similarly, because model version 424 is trained to classify images as cats, horses, or something that is neither a cat nor a horse, and the image in input task 510 includes features that are more like a horse than the other choices, version 424 produces output 534: the image is classified as a horse. Similarly, because model version 426 is trained to classify images as cats, various equines (including horses, zebras, donkeys, and other equine species) or something else, and the image in input task 510 includes features that are more like a zebra than the other choices, version 426 produces output 536: the image is classified as a zebra.

Thus, comparing outputs 536 and 534, application 300 generates explanation 540: "Based on the most current model, this is an image of a zebra. Using a previous version of this model that was trained on horses but not zebras, I would have classified this image as a horse." Alternatively, comparing outputs 536 and 532, application 300 generates explanation 550: "Based on the most current model, this is an image of a zebra. Using a previous version of this model that was trained only on pictures of cats but not equines, I would have classified this image as a cat."

Figure 6:
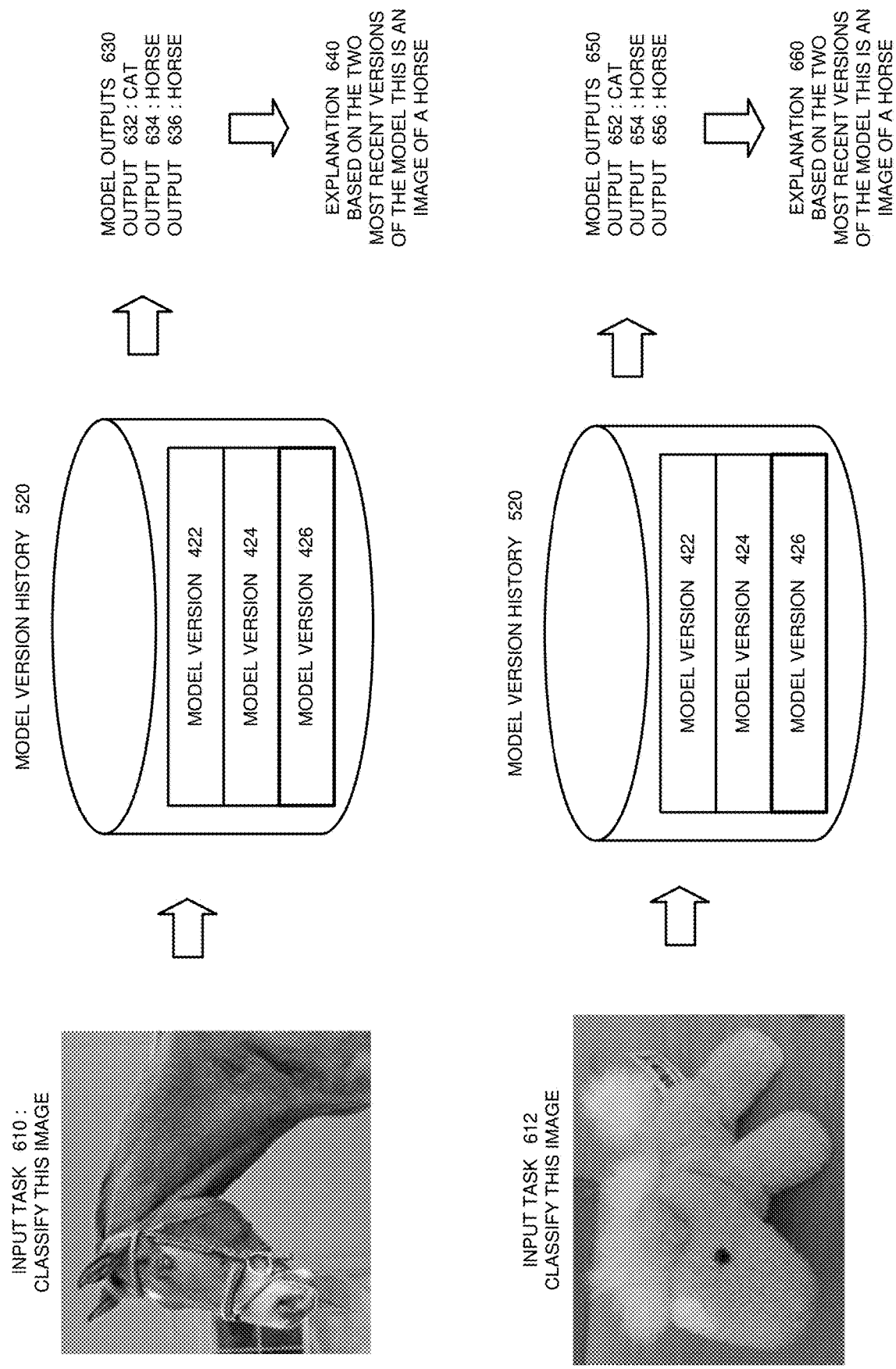
FIG. 6 depicts a continued example of version based model result explainability in accordance with an illustrative embodiment.

With reference to FIG. 6, this figure depicts a continued example of version based model result explainability in accordance with an illustrative embodiment. Model versions 422, 424, and 426 are the same as model versions 422, 424, and 426 in FIG. 4. Model version history 520 is the same as model version history 520 in FIG. 5.

Input task 610 is a model execution task to classify an image. To perform task 610, application 300 uses model versions 422, 424, and 426, stored in model version history 520, to produce model outputs 630. In particular, version 422 produces output 632: the image is classified as a cat. Similarly, version 424 produces output 634: the image is classified as a horse, and version 426 produces output 636: the image is classified as a horse. Thus, comparing outputs 636 and 634, application 300 generates explanation 640: "Based on the two most recent versions of the model this is an image of a horse."

Input task 612 is a model execution task to classify an image. To perform task 612, application 300 uses model versions 422, 424, and 426, stored in model version history 520 to produce model outputs 650. In particular, version 422 produces output 652: the image is classified as a cat. Similarly, version 424 produces output 654: the image is classified as a horse, and version 426 produces output 656: the image is classified as a horse. Thus, comparing outputs 656 and 654, application 300 generates explanation 660: "Based on the two most recent versions of the model this is an image of a horse." Note that a user can compare explanations 640 and 660 and determine that the image classification model needs additional training to distinguish real horses from stuffed toy horses.

Figure 7:
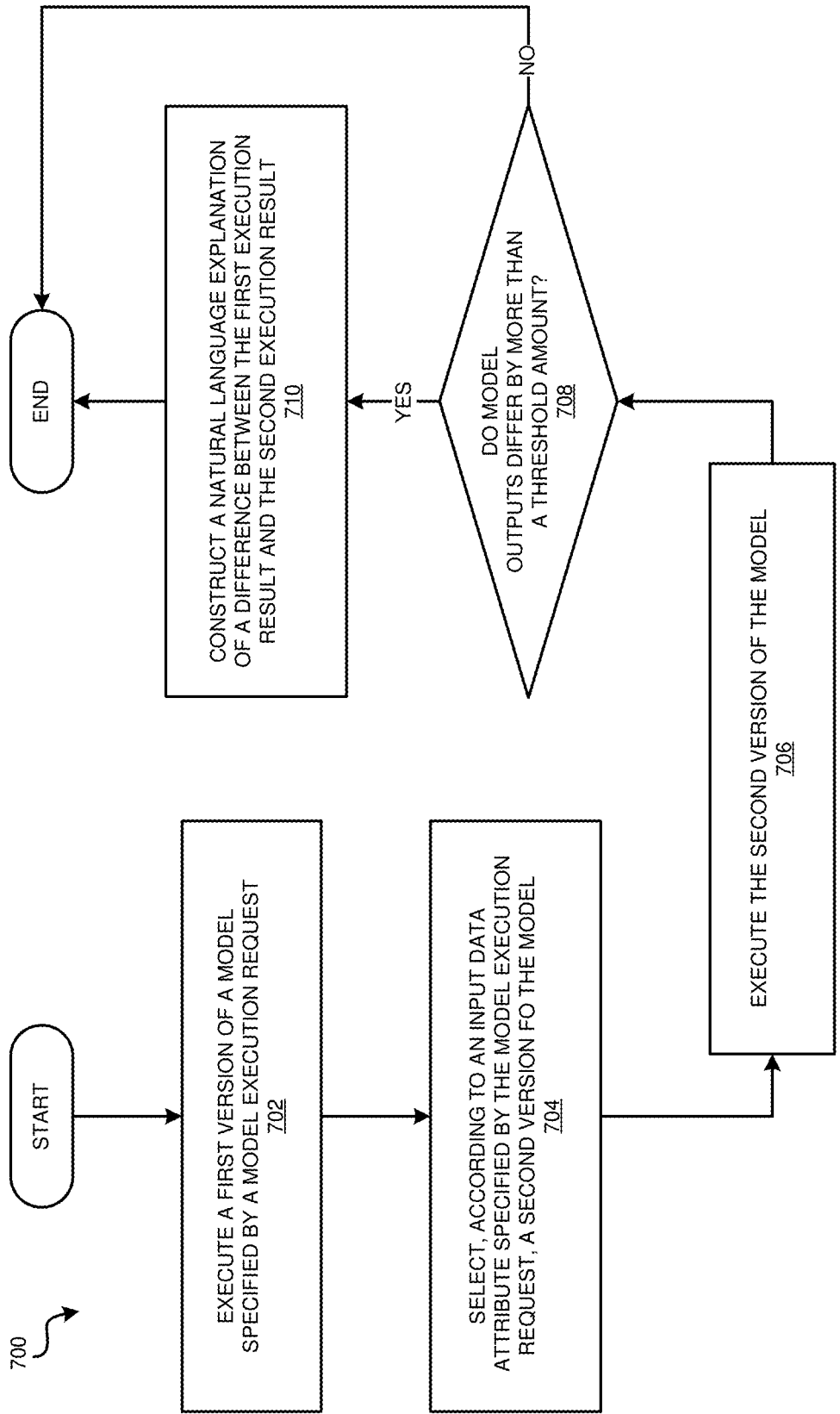
FIG. 7 depicts a flowchart of an example process for version based model result explainability in accordance with an illustrative embodiment.

With reference to FIG. 7, this figure depicts a flowchart of an example process for version based model result explainability in accordance with an illustrative embodiment. Process 700 can be implemented in application 300 in FIG. 3.

In block 702, the application executes a first version of a model specified by a model execution request. In block 704, the application selects, according to an input data attribute specified by the model execution request, a second version of the model. In block 706, the application executes the second version of the model. In block 708, the application determines whether the model outputs differ by more than a threshold amount. If so ("YES" path of block 708), in block 710, the application constructs a natural language explanation of a difference between the first execution result and the second execution result. Then (also "NO" path of block 708), the application ends.

Figure 8:
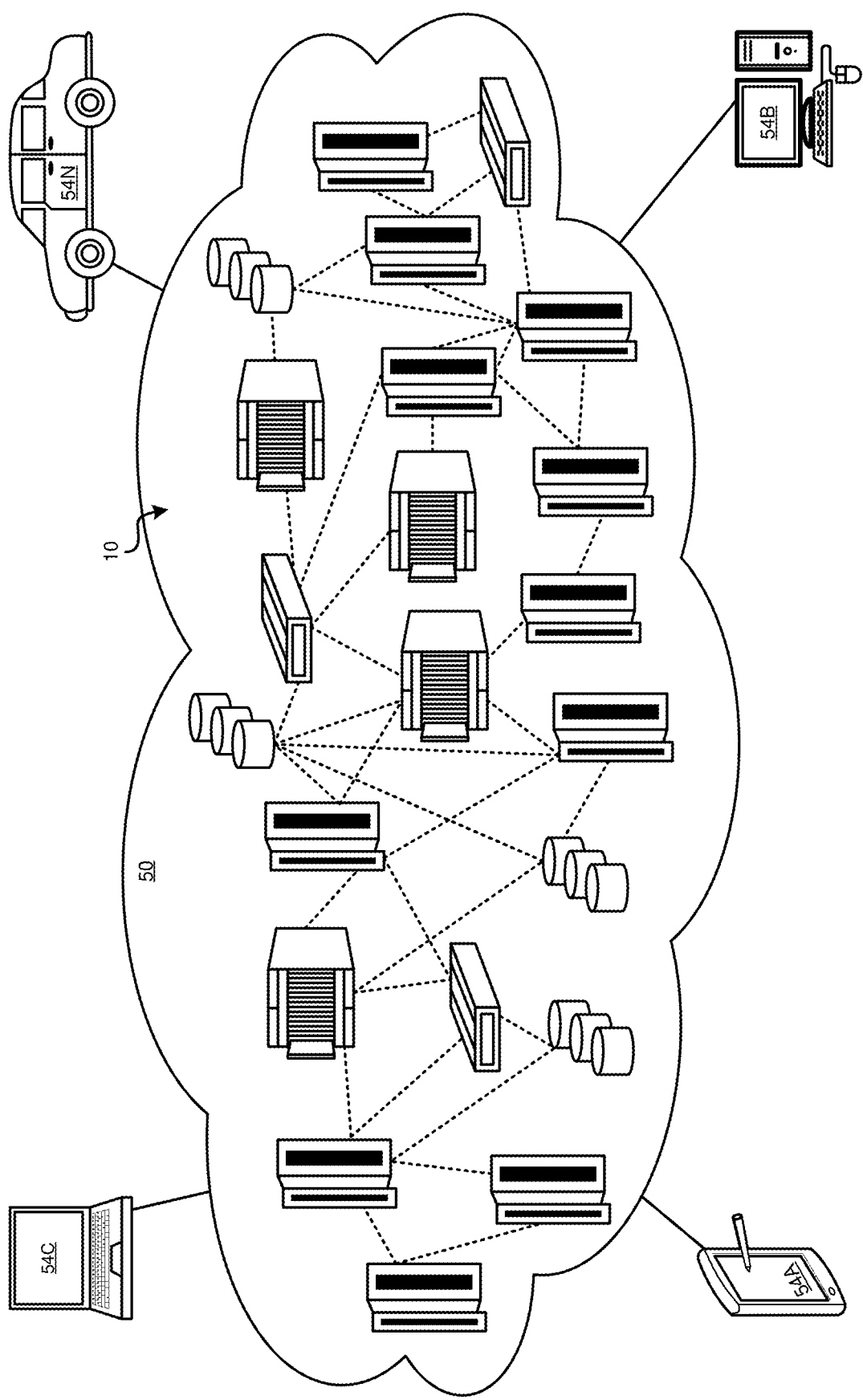
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 9:
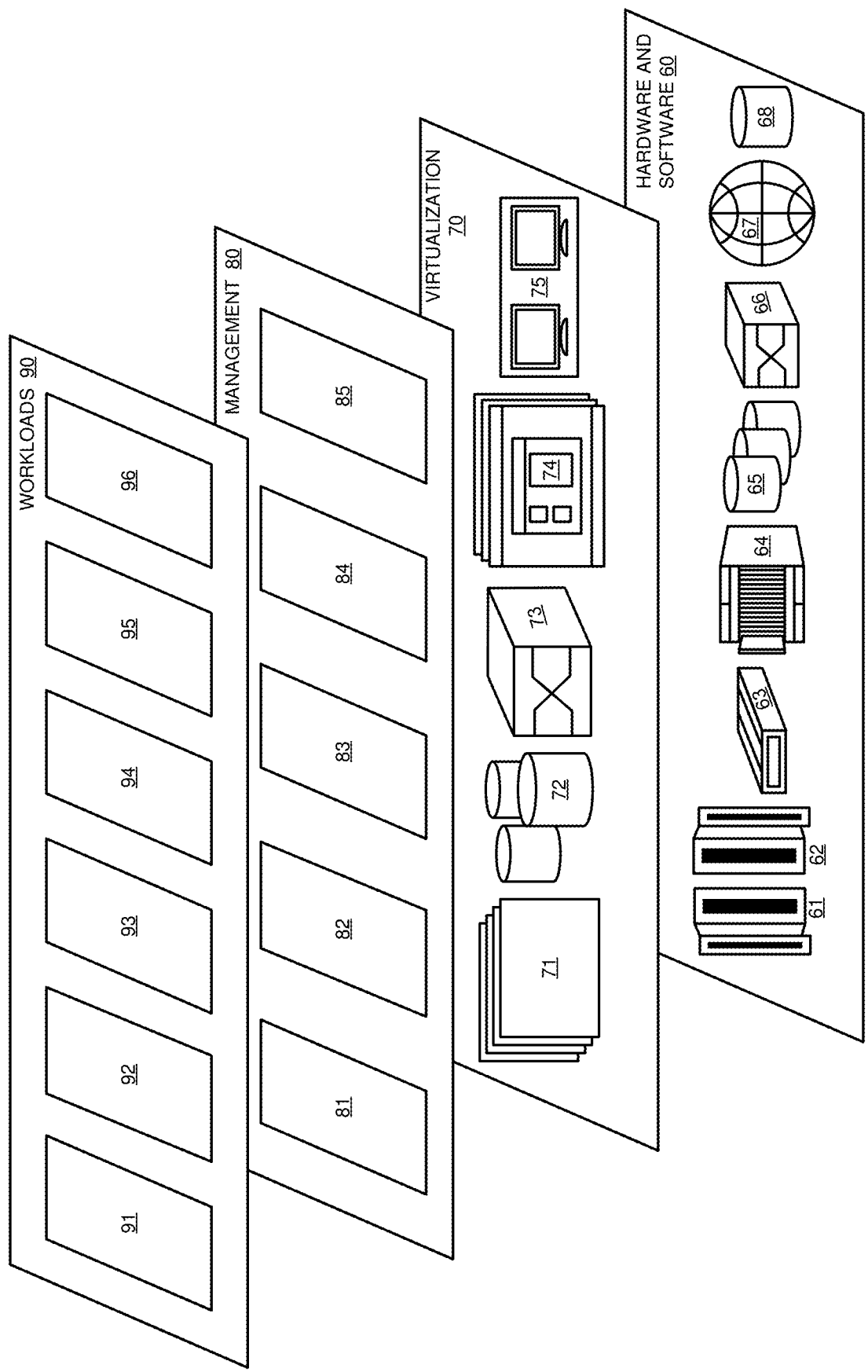
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for version based model result explainability and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    executing, producing a first execution result, a first version of a model, the first version of the model comprising a most recent version of the model, the model specified by a model execution request;
    computing a similarity measure between a first training data set used to train the first version of the model to a second training data set used to train a second version of the model;
    selecting, responsive to a determination that the second training data set differs by more than a first threshold amount from a second training data set, according to an input data attribute specified by the model execution request, the second version of the model;
    executing, producing a second execution result, the second version of the model;
    constructing, using a natural language processing engine, responsive to the first execution result and the second execution result differing by more than a threshold amount, a natural language explanation of a difference between the first execution result and the second execution result; and
    retraining the most recent version of the model with additional training data based on the natural language explanation of the difference between the first execution result and the second execution result.

2. The computer-implemented method of claim 1, wherein the first version of the model comprises a most recent version of the model and the second version of the model comprises a next-most recent version of the model.

3. The computer-implemented method of claim 2, further comprising:
    selecting, responsive to the first execution result and the second execution result differing by less than or equal to the threshold amount, a third version of the model, the third version of the model comprising a version immediately prior to the next-most recent version of the model;
    executing, producing a third execution result, the third version of the model; and constructing, using the natural language processing engine, responsive to the first execution result and the third execution result differing by more than a second threshold amount, a natural language explanation of a difference between the first execution result and the third execution result.

4. The computer-implemented method of claim 1, wherein the first version of the model comprises a most recent version of the model and the second version of the model comprises a version with an input attribute changed by more than a threshold amount from an input attribute of the most recent version of the model.

5. The computer-implemented method of claim 4, further comprising:
    selecting, responsive to the first execution result and the second execution result differing by less than or equal to the threshold amount, a fourth version of the model, the fourth version of the model comprising a version with an input attribute changed by more than a threshold amount from an input attribute of the second version of the model;
    executing, producing a fourth execution result, the fourth version of the model; and
    constructing, using the natural language processing engine, responsive to the first execution result and the fourth execution result differing by more than a third threshold amount, a natural language explanation of a difference between the first execution result and the fourth execution result.

6. The computer-implemented method of claim 1, further comprising:
    selecting, responsive to the first execution result and the second execution result differing by less than or equal to the threshold amount, a fifth version of the model, the fifth version of the model comprising a version trained using a third training data set that differs by more than a threshold amount from the second training data set;
    executing, producing a fifth execution result, the fifth version of the model; and
    constructing, using the natural language processing engine, responsive to the first execution result and the fifth execution result differing by more than a fourth threshold amount, a natural language explanation of a difference between the first execution result and the fifth execution result.

7. A computer program product for model result explainability, the computer program product comprising:
    one or more computer readable storage media, and program instructions collectively stored on the one or more computer readable storage media, the stored program instructions comprising:
    program instructions to execute, producing a first execution result, a first version of a model, the first version of the model comprising a most recent version of the model, the model specified by a model execution request;

program instructions to compute a similarity measure between a first training data set used to train the first version of the model to a second training data set used to train a second version of the model;

program instructions to select, responsive to a determination that the second training data set differs by more than a first threshold amount from a second training data set, according to an input data attribute specified by the model execution request, the second version of the model;

program instructions to execute, producing a second execution result, the second version of the model;

program instructions to construct, using a natural language processing engine, responsive to the first execution result and the second execution result differing by more than a threshold amount, a natural language explanation of a difference between the first execution result and the second execution result; and program instructions to retrain the most recent version of the model with additional training data based on the natural language explanation of the difference between the first execution result and the second execution result.

8. The computer program product of claim 7, wherein the first version of the model comprises a most recent version of the model and the second version of the model comprises a next-most recent version of the model.

9. The computer program product of claim 8, the stored program instructions further comprising:

program instructions to select, responsive to the first execution result and the second execution result differing by less than or equal to the threshold amount, a third version of the model, the third version of the model comprising a version immediately prior to the next-most recent version of the model;

program instructions to execute, producing a third execution result, the third version of the model; and program instructions to construct, using the natural language processing engine, responsive to the first execution result and the third execution result differing by more than a second threshold amount, a natural language explanation of a difference between the first execution result and the third execution result.

10. The computer program product of claim 7, wherein the first version of the model comprises a most recent version of the model and the second version of the model comprises a version with an input attribute changed by more than a threshold amount from an input attribute of the most recent version of the model.

11. The computer program product of claim 10, the stored program instructions further comprising:

program instructions to select, responsive to the first execution result and the second execution result differing by less than or equal to the threshold amount, a fourth version of the model, the fourth version of the model comprising a version with an input attribute changed by more than a threshold amount from an input attribute of the second version of the model;

program instructions to execute, producing a fourth execution result, the fourth version of the model; and program instructions to construct, using the natural language processing engine, responsive to the first execution result and the fourth execution result differing by more than a third threshold amount, a natural language explanation of a difference between the first execution result and the fourth execution result.

12. The computer program product of claim 7, the stored program instructions further comprising:

program instructions to select, responsive to the first execution result and the second execution result differing by less than or equal to the threshold amount, a fifth version of the model, the fifth version of the model comprising a version trained using a third training data set that differs by more than a threshold amount from the second training data set;

program instructions to execute, producing a fifth execution result, the fifth version of the model; and program instructions to construct, using the natural language processing engine, responsive to the first execution result and the fifth execution result differing by more than a fourth threshold amount, a natural language explanation of a difference between the first execution result and the fifth execution result.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to execute, producing a first execution result, a first version of a model, the first version of the model comprising a most recent version of the model, the model specified by a model execution request;

program instructions to compute a similarity measure between a first training data set used to train the first version of the model to a second training data set used to train a second version of the model;

program instructions to select, responsive to a determination that the second training data set differs by more than a first threshold amount from a second training data set, according to an input data attribute specified by the model execution request, the second version of the model;

program instructions to execute, producing a second execution result, the second version of the model;

program instructions to construct, using a natural language processing engine, responsive to the first execution result and the second execution result differing by more than a threshold amount, a natural language explanation of a difference between the first execution result and the second execution result; and program instructions to retrain the most recent version of the model with additional training data based on the natural language explanation of the difference between the first execution result and the second execution result.

\* \* \* \* \*